United States Patent [19]

Vilmur et al.

[11] Patent Number: 5,590,177
[45] Date of Patent: Dec. 31, 1996

[54] METHOD FOR PREVENTING A DROPPED CALL DURING A HANDOFF IN A RADIOTELEPHONE SYSTEM

[75] Inventors: Richard J. Vilmur, Palatine; Eugene J. Bruckert, Arlington Heights, both of Ill.

[73] Assignee: Motorola, Inc., Schaumburg, Ill.

[21] Appl. No.: 316,697

[22] Filed: Sep. 30, 1994

[51] Int. Cl.$^6$ ............................. H04Q 7/22; H04J 13/02
[52] U.S. Cl. ........................ 379/60; 455/33.2; 370/335; 370/332
[58] Field of Search ........................ 379/58, 59, 60, 379/63; 455/33.1, 33.2, 33.4, 54:1, 54.2, 56.1; 375/200, 205

[56] References Cited

U.S. PATENT DOCUMENTS

| | | | |
|---|---|---|---|
| 4,811,380 | 3/1989 | Spear | 379/60 |
| 5,095,500 | 3/1992 | Tayloe et al. | 379/59 X |
| 5,170,485 | 12/1992 | Levine et al. | 379/60 X |
| 5,189,734 | 2/1993 | Bailey et al. | 455/33.2 |
| 5,230,082 | 7/1993 | Ghisler et al. | |
| 5,253,268 | 10/1993 | Omura et al. | 375/200 |
| 5,265,263 | 11/1993 | Ramsdale et al. | 455/33.2 |
| 5,325,419 | 6/1994 | Connolly et al. | 379/60 |
| 5,367,559 | 11/1994 | Kay et al. | 379/60 |
| 5,396,253 | 3/1995 | Chia | 379/59 X |
| 5,404,376 | 4/1995 | Dent | 375/200 |

FOREIGN PATENT DOCUMENTS

| | | |
|---|---|---|
| 2263377 | 7/1993 | United Kingdom . |
| 2284321 | 5/1995 | United Kingdom . |
| WO91/19403 | 12/1991 | WIPO . |
| WO92/14317 | 8/1992 | WIPO . |
| WO95/12295 | 5/1995 | WIPO . |

OTHER PUBLICATIONS

Kerr, Richard et al., "The CDMA Digital Cellular System, an Asic Overview", *IEEE 1992 Custom Integrated Circuits Conference*, Qualcomm, Inc., pp. 10.1.1–10.1.7.

Hinderling, Jurg et al., "CDMA Mobile Station Modem ASIC," *IEEE 1992 Custom Integrated Circuits Conference*, Qualcomm, Inc., pp. 10.2.1–10.2.5.

Whipple, David P., "The CDMA Standard", *Applied Microwave & Wireless*, 1994, pp. 24–37.

*Primary Examiner*—Curtis Kuntz
*Assistant Examiner*—Michael B. Chernoff
*Attorney, Agent, or Firm*—Kevin D. Kaschke

[57] ABSTRACT

A method, performed by a mobile station (119), prevents an active call from being dropped when the mobile station (119) suddenly transitions from a first coverage area (121) to a second coverage area (122) in a code division multiple access (CDMA) cellular radiotelephone system (100). The active call is determined (601) to be in danger of being dropped responsive to the mobile station (119) suddenly transitioning from the first coverage area (121) to the second coverage area (122). The first base station (115) is notified (602) that the active call is in danger of being dropped responsive to the step of determining (601). The active call with the first base station (115) is determined (603) to be in the process of being dropped responsive to the step of notifying (602). The active call is established (604) with the second base station (116) in the second coverage area (122) before the active call with the first base station (115) is dropped responsive to the step of determining (603).

22 Claims, 10 Drawing Sheets

| FIELD | LENGTH(BITS) |
|---|---|
| 801 — MSG_TYPE('00000111') | 8 |
| 802 — ACK_SEQ | 3 |
| 803 — MSG_SEQ | 3 |
| 804 — ACK_REQ | 1 |
| 805 — VALID_ACK | 1 |
| 806 — ACK_TYPE | 3 |
| 807 — MSID_TYPE | 3 |
| 808 — MSID_LEN | 4 |
| 809 — MSID | 8 x MSID_LEN |
| 810 — AUTH_MODE | 2 |
| 811 — AUTHR | 0 OR 18 |
| 812 — RANDC | 0 OR 8 |
| 813 — COUNT | 0 OR 6 |
| 814 — MOB_TERM | 1 |
| 815 — SLOT_CYCLE_INDEX | 3 |
| 816 — MOB_P_REV | 8 |
| 817 — SCM | 8 |
| 818 — REQUEST_MODE | 3 |
| 819 — SPECIAL_SERVICE | 1 |
| 820 — SERVICE_OPTION | 0 OR 16 |
| 821 — PM | 1 |
| 822 — REF_PN | 9 |
| 823 — PILOT_STRENGTH | 6 |
| 824 — TCH_REF | 6 |
| 825 — PILOT_PN_PHASE | 15 |
| 826 — PILOT_STRENGTH | 6 |

*FIG. 8*

| FIELD | LENGTH(BITS) |
|---|---|
| 901 — MSG_TYPE('00000111') | 8 |

ONE OR MORE OCCURRENCES OF THE FOLLOWING RECORD

| FIELD | LENGTH(BITS) |
|---|---|
| 902 — ACK_SEQ | 3 |
| 903 — MSG_SEQ | 3 |
| 904 — ACK_REQ | 1 |
| 905 — VALID_ACK | 1 |
| 906 — ADD_TYPE | 3 |
| 907 — ADD_LEN | 4 |
| 908 — ADDRESS | 8 x ADD_LEN |
| 909 — ADD_RECORD_LEN | 3 |

| FIELD | LENGTH(BITS) |
|---|---|
| 910 — FREQ_INCL | 1 |
| 911 — CODE_CHAN | 8 |
| 912 — CDMA_FREQ | 0 OR 11 |
| 913 — FRAME_OFFSET | 4 |
| 914 — ENCRYPT_MODE | 2 |
| 915 — RESERVED | 0-7(AS NEEDED) |

*FIG. 9*

METHOD FOR PREVENTING A DROPPED CALL DURING A HANDOFF IN A RADIOTELEPHONE SYSTEM

FIELD OF THE INVENTION

The present invention relates generally to radiotelephone systems and, more particularly, to a method, performed by a mobile station, for preventing an active call from being dropped when the mobile station suddenly transitions from a first coverage area to a second coverage area of a radiotelephone system.

BACKGROUND OF THE INVENTION

Radiotelephone systems are generally well known in the art. A particular type of radiotelephone system is a cellular radiotelephone system. Cellular radiotelephone systems generally include a switch controller coupled to a public switched telephone network (PSTN) and a plurality of base stations. Each of the plurality of base stations generally defines a geographic region proximate to the base station to produce coverage areas. One or more mobile stations communicate with a base station that facilitates a call between the mobile station and the public switched telephone network. A detailed description of a cellular radiotelephone system is described in the book "Mobile Cellular Communications Systems" by Dr. William C. Y. Lee, 1989.

A handoff in a cellular radiotelephone system is defined as a transition between the mobile station communicating with a first base station supporting a first coverage area and the mobile station communicating with a second base station supporting a second coverage area. The handoff may be either base controlled, mobile controlled, or base and mobile controlled. A mobile assisted handoff (MAHO) is defined as a base controlled handoff that uses information provided by the base station as well as information provided by the mobile station.

Handoffs are further characterized as being hard hand offs or soft handoffs. During a hard handoff communication between the mobile station and the first base station is terminated prior to the initiation of communication between the mobile station and the second base station. During a soft handoff, communication between the mobile station and the second base station is initiated prior to the termination of communication between the mobile station and the first base station. Cellular radiotelephone communication systems employing soft handoffs typically use the same radio frequency (RF) channel for communication between the mobile station and the first base station or the second base station.

A problem in cellular radiotelephone communication systems is that the communication between the mobile station and the switch controller is terminated when a needed handoff is unsuccessful. This termination is otherwise known as a dropped call. Although mobile assisted handoffs and soft handoffs have reduced the frequency of dropped calls, a condition in cellular radiotelephone communication systems exists which still causes calls to be dropped. The condition is when the mobile station is in an active call in the first coverage area with the first base station and substantially shadowed from transmissions from the second base station in the second coverage area. When the mobile station suddenly transitions from the first coverage area to the second coverage area, the mobile station experiences a substantial increase in the signal transmissions from the second base station relative to the signal transmissions from the first base station. If the substantial increase in signal transmissions from the second base station occurs over a relatively short time duration, the signal transmissions from the second base station interfere with the communication between the mobile station and the first base station thereby preventing handoff messaging and resulting in the dropped call.

Prior art provides a cellular radiotelephone system with dropped call protection in U.S. Pat. No. 4,811,380. This reference teaches an improved cellular telephone communication system having operational steps which prevent a call from being dropped due to a radiotelephone not receiving a handoff instruction from its host base site. The system includes a switch controller for determining that the radiotelephone requires a handoff from a first base site coverage area to a second base site coverage area and for communicating a handoff message to the associated first and second base site equipment. The first base site equipment then transmits the handoff message to the radiotelephone. If the radiotelephone does not receive the message, it determines that the call has been lost, seizes a signaling channel from the second base site, and requests, via the second base site a call reconnection by transmitting a special message. The second base site then informs the radiotelephone of the handoff instruction and the handoff is completed with a successful reconnection of the call.

A problem with the technique described in U.S. Pat. No. 4,811,380 is that the mobile station only takes action to recover a call after the absence of a signal transmission from the first base station over a predetermined period of time. The prior art mobile station does not predict the changing RF conditions that are setting up a self-interference condition in the radiotelephone system that requires a hand-off. Since the prior art mobile station does not predict the changing RF conditions, either the call is dropped before the handoff messaging can be successfully completed or the time delay for the recovery of the dropped call is unacceptable to a user of the mobile station.

Accordingly, there is a need for a method, performed by the mobile station, for preventing the active call from being dropped when the mobile station suddenly transitions from the first coverage area to the second coverage area of the radiotelephone system that overcomes the disadvantages of a dropped call or the time delay resulting from the recovery of the dropped call.

SUMMARY OF THE INVENTION

A cellular radiotelephone communication system includes at least one switch controller, a plurality of base stations, including first and second base stations, and at least one mobile station. A switch controller is coupled to the first and second base stations to provide radiotelephone communication throughout first and second coverage areas, respectively. A mobile station is in an active call in the first coverage area with the first base station on a first traffic channel and is substantially shadowed from transmissions from the second base station in the second coverage area. A method, performed by the mobile station, prevents the active call from being dropped when the mobile station suddenly transitions from the first coverage area to the second coverage area. The method comprises the steps of: determining that the active call is in danger of being dropped responsive to the mobile station suddenly transitioning from the first coverage area to the second coverage area; notifying the first base station that the active call is in danger of being dropped, responsive top the step of determining that the active call is in danger of being dropped; determining that the active call with the first base station is in the process of being dropped, responsive to the step of notifying the first base station that the active call is in danger of being dropped; and establishing the active call with the second base station in the second coverage area before the active call with the first base station is dropped responsive to the step of determining that the active call with the first base station is in the process of being dropped.

BRIEF DESCRIPTION OF THE DRAWINGS

FIG. 7-1 and FIG. 7-2 illustrates details of the flow chart of FIG. 6 in accordance with the present invention.

DETAILED DESCRIPTION OF THE PREFERRED EMBODIMENT

Figure 1:
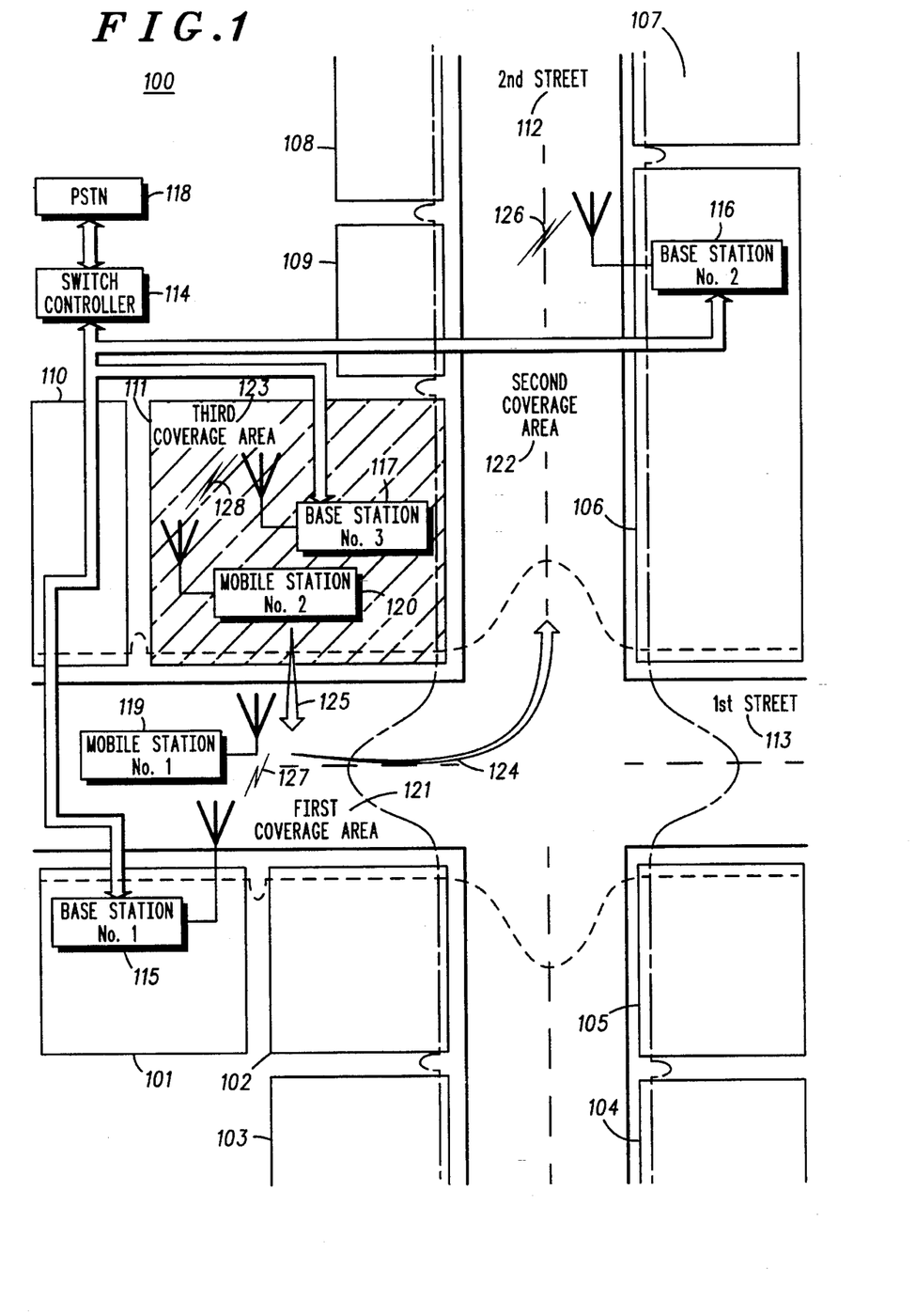
FIG. 1 illustrates a portion of a cellular radiotelephone system in accordance with the present invention.

The present invention can be more fully described with reference to FIGS. 1–9, wherein FIG. 1 illustrates a portion of a cellular radiotelephone system 100 in accordance with the present invention. By example, FIG. 1 generally illustrates a dense urban environment having tall closely spaced buildings 101–111 located at the intersection of a first street 113 and a second street 112. Radiotelephone coverage of this urban environment is provided by the cellular radiotelephone system 100. The cellular radiotelephone system 100 generally comprises a switch controller 114, a first base station 115, a second base station 116, a third base station 117, a public switched telephone network (PSTN) 118, a first mobile station 119 and a second mobile station 120. The first base station 115 has a first radiotelephone coverage area 121 along the first street 113. Likewise the second base station 116 has a second radiotelephone coverage area 122 generally provided along the second street 112. The third base station 117 has a third coverage area 123 essentially provided within building 111.

The switch controller 114 is coupled to the first base station 115 and the second base station 116 to provide radiotelephone communication throughout the first coverage area 121 and the second coverage area 122, respectively. For purposes of explanation, the first mobile station 119 is initially in an active call in the first coverage area 121 with the first base station 115 on a first traffic channel and substantially shadowed from transmissions 126 from the second base station 116 in the second coverage area 122 by building 111. The present invention describes a method performed by the mobile station, the first mobile station 119 for example, for preventing the active call from being dropped when the mobile station 119 suddenly transitions (as shown by arrow 124) from the first coverage area 121 to the second coverage area 122.

In the preferred embodiment of the present invention, the first coverage area 121 and the second coverage area 122 are shown as macrocoverage areas, otherwise known as macrocells, that cover a relatively large geographic area. The third coverage area 123 is shown as a microcoverage area, otherwise known as a microcell, that covers a relatively small geographic area. The coverage areas 121, 122, and 123 of the respective base stations 115, 116, and 117 may be overlapping partially or completely. For example, a microcell may be completely embodied within a macrocell. Therefore, the present invention contemplates that the mobile station 119 can handoff between macrocells, between microcells or between a macrocell and a microcell.

The cellular radiotelephone system 100 as shown in FIG. 1 is not limited to the configuration, as shown. The cellular radiotelephone system 100 may comprise additional switch controllers, bases stations and mobile stations to cover a wide geographic area as is well known in the art. The cellular radiotelephone system 100 may provide radiotelephone communication coverage to other areas of urban and non-urban environments. In the preferred embodiment of the present invention, the switch controller 114, the first base station 115, the second base station 116, the third base station 117, and the PSTN 118 are each well known in the art and thus no further description will be given except to facilitate the understanding of the present invention.

In the preferred embodiment the cellular radiotelephone communication system 100 is a code division multiple access (CDMA) cellular radiotelephone communication system as described in TIA/EIA, IS-95, Mobile Station-Base Station Compatibility Standard for Dual-Mode Wideband Spread Spectrum Cellular System, published July 1993. CDMA is a technique for spread-spectrum multiple-access digital communications that creates channels through the use of unique code sequences. In CDMA signals can be and are received in the presence of high levels of interference. The practical limit of signal reception depends on the channel conditions, but CDMA reception in the system described in the aforementioned IS-95 Standard can take place in the presence of interference that is 18 dB larger than the signal for a static channel. Typically the system operates with a lower level of interference and dynamic channel conditions.

The coverage areas of the cellular radiotelephone communication system 100 may be divided into sectors as is well known in the art. In a CDMA system the frequencies for communication are reused in every sector of every cell, and most of the interference on a given frequency as seen by a mobile station is from cells outside that in which the mobile station resides. The residual interference on a given frequency as seen by a mobile station is from the user traffic from within the same cell on the same frequency from time delayed (reflected) rays.

A CDMA base station communicates with a mobile station with a signal having a basic data rate of 9600 bits/s. The signal is then spread to a transmitted bit rate, or chip rate, of 1.2288 MHz. Spreading consists of applying digital codes to the data bits that increase the data rate while adding redundancy to the CDMA system. The chips of all the users in that cell are then added to form a composite digital signal. The composite digital signal is then transmitted using a form of quadrature phase shift keying (QPSK) modulation that has been filtered to limit the bandwidth of the signal.

When the transmitted signal is received by a mobile station, the coding is removed from the desired signal, returning it to a data rate of 9600 bits/s. When the coding is applied to the other users' codes, there is no despreading; the received signal maintains the 1.2288 MHz bandwidth. The ratio of transmitted bits or chips to data bits is the coding gain. The coding gain for a North American CDMA system is 128, or 21 dB. Because of this coding gain of 21 dB, interference of up to 18 dB above the signal level (3 dB below the signal strength after coding gain) can be tolerated for a static channel.

Alternative digital cellular radiotelephone communication systems contemplated to be within the scope of the present invention include: Global System for Mobile Communications (GSM), Time Division Multiple Access (TDMA), and Extended TDMA (E-TDMA). GSM has been adopted across Europe and in many countries for the Pacific Rim. It uses 200-kHz channels with eight users per channel using TDMA, and has a vocoder rate of 13 kbits/s. TDMA uses 30-kHz channels, three users per channel and has a vocoder rate of 8 kbits/s. E-TDMA also uses 30-kHz channels, but has six users per channel with a vocoder rate of 4 kbits/s.

In the preferred embodiment of the present invention, the mobile station 119 is a cellular radiotelephone subscriber unit. The mobile station 119 may take many forms that are well known in the art, such as a vehicular mounted unit, a portable unit, or a transportable unit. According to the preferred embodiment of the present invention, the mobile station is a CDMA mobile station designed to be compatible with the CDMA cellular radiotelephone system as described in the aforementioned IS-95 Standard.

According the preferred embodiment of the present invention, the active call may comprise either voice or data communications between the mobile station 119 and a base station. Therefore, the present invention generally contemplates loss prevention of any type of information being transferred between the mobile station 119 and a base station.

Generally, the present invention may be employed in any radiotelephone system in which the mobile station has the capability of monitoring the strength of signals transmitted by a plurality of base stations in parallel with communicating in an active call. Since the cellular radiotelephone communication system 100 of the preferred embodiment is a digital system, the digital system messaging format permits the mobile station 119 to perform other functions in parallel with communicating in an active call. The present invention leverages this aspect of the digital cellular radiotelephone communication system 100 to permit the mobile station 119 to perform the method for preventing the active call from being dropped when the mobile station 119 suddenly transitions from the first coverage area 121 to the second coverage area 122.

FIG. 1 shows two examples of how a mobile station is shadowed from transmissions from a base station. In a first example, as previously discussed, the first mobile station 119 is shadowed from transmissions from the second base station by building 111. In a second example, the second mobile station 120 is in an active call in the third coverage area 123 with the third base station 117 and substantially shadowed from transmissions from the first base station 115 in the first coverage area 121 and the second base station 116 in the second coverage area 122. According to the first example, when the first mobile station 119 suddenly transitions from the first coverage area 121 to the second coverage area 122 (as indicated by arrow 124), the mobile station experiences a substantial increase in signal transmissions 126 from the second base station 116 relative to the signal transmissions 127 from the first base station 115. If the substantial increase in signal transmissions 126 from the second base station 116 occurs over relatively short time duration, the signal transmissions 126 from the second base station 116 interfere with the communication between the first mobile station 119 and the first base station 115 thereby preventing handoff messaging and resulting in a dropped call. Likewise, according to the second example, a similar result occurs when the mobile station suddenly transitions from the third coverage area 123 to the first coverage area 121 or the second coverage area 122. Such sudden transitions between coverage areas are primarily caused by a rapid change in shadowing conditions. For example, such sudden transitions may be caused by the speed of travel of the mobile station itself, the mobile station turning a sharp corner of a building, or the mobile station entering or exiting a shielded area such as a building with the microcell embodied within.

Figure 2:
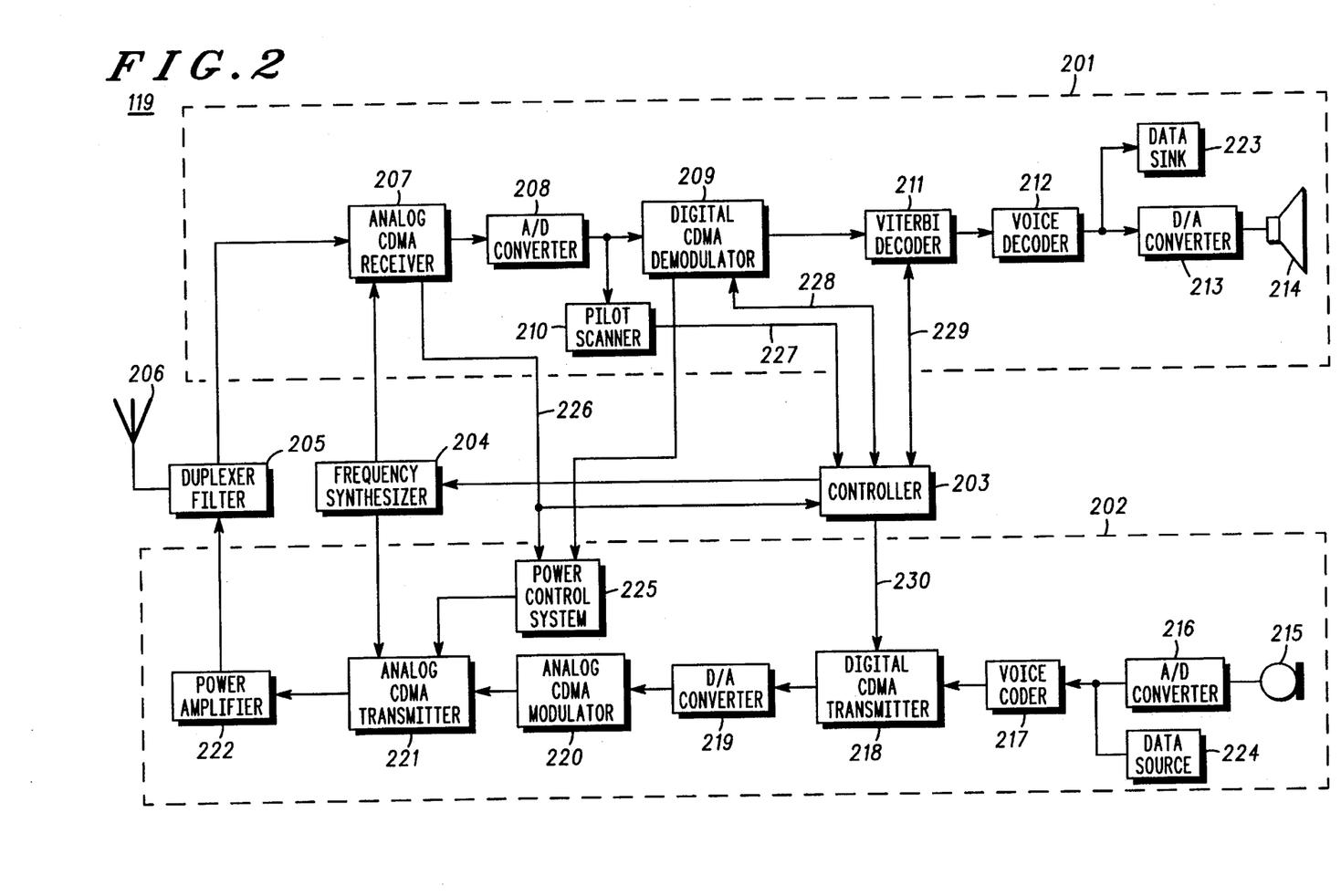
FIG. 2 illustrates a block diagram of a mobile station used in the cellular radiotelephone system of FIG. 1 in accordance with the present invention.

FIG. 2 illustrates a block diagram of a mobile station used in the cellular radiotelephone system of FIG. 1 in accordance with the present invention. The mobile station 119 generally comprises a receiver lineup 201, a transmitter lineup 202, a controller 203, a frequency synthesizer 204, a duplexer filter 205 and an antenna 206. Both the receiver lineup 201 and the transmitter lineup 202 share the functions of the controller 203, the frequency synthesizer 204, the duplexer filter 205 and the antenna 206 as is well known in the art. The receiver lineup 201 generally comprises an analog CDMA receiver 207, an analog to digital converter (A/D) 208, a digital CDMA demodulator 209, a pilot scanner 210 a Viterbi decoder 211, a voice decoder 212, a digital to analog converter (D/A) 213, a data sink 223 and a speaker 214. The transmitter lineup 202 generally comprises an voice source, such as microphone 215, or a data source 224, an A/D converter 216, a voice coder 217, a digital CDMA transmitter 218, a D/A converter 219, an analog CDMA modulator 220, an analog CDMA transmitter 221, a power amplifier 222 and a power control system 225.

In the preferred embodiment of the present invention, the digital CDMA demodulator 209, the pilot scanner 210, the Viterbi decoder 211 and digital CDMA transmitter 218 are embodied within an application specific integrated circuit (ASIC) as described in "CDMA Mobile Station Modem ASIC", *Proceedings of the IEEE* 1992 *Custom Integrated Circuits Conference,* section 10.2, pages 1–5; and "The CDMA Digital Cellular System an ASIC Overview", *Proceedings of the IEEE* 1992 *Custom Integrated Circuits Conference,* section 10.1, pages 1–7.

According to the preferred embodiment of the present invention, the analog CDMA receiver 207 is substantially an analog receiver designed to be compatible with the 1.2288 MHz bandwidth required for CDMA receiver operation. The digital CDMA transmitter 218, the analog CDMA modulator 220, the analog CDMA transmitter 221, the power amplifier 222 and the power control system 225 are generally specified in the aforementioned IS-95 Standard. The controller 203 is a MC68332 microcontroller manufactured and available from Motorola, Inc. Alternatively, other microcontrollers or digital signal processors (DSP) may also be used. For example, the digital signal processor may be a MC56156 manufactured and available from Motorola, Inc. The frequency synthesizer 204, the duplexer filter 205 and the antenna 206 are substantially the same as that implemented in conventional analog cellular radiotelephone mobile stations. The voice decoder 212 and the voice encoder 217 are preferably implemented with the digital signal processor programmed in accordance with TIA/EIA/IS-96-A, "Speech Service Option Standard For Wideband Spread Spectrum Digital Cellular Systems".

In accordance with the preferred embodiment of the present invention, the method performed by the mobile station for preventing the active call from being dropped when the mobile station 119 suddenly transitions from the first coverage area 121 to the second coverage area 122 is embodied as a software program in the controller 203 of FIG. 2. In the preferred embodiment of the present invention, the controller 203 received signal strength information (RSSI), indicative of a total energy (Io) received by the mobile station 119 at line 226, pilot signal strength information at line 227 from the pilot scanner 210, signal strength information for the active call at line 228 from the digital CDMA demodulator 209, and received system control messages at line 229 from the Viterbi decoder 211. The controller 203 sends system control messages at line 230 via the digital CDMA transmitter 218. The method steps performed by the mobile station 119 and embodied within the controller 203 of FIG. 2 are further described with reference to FIGS. 3 through 7-2.

Figure 3:
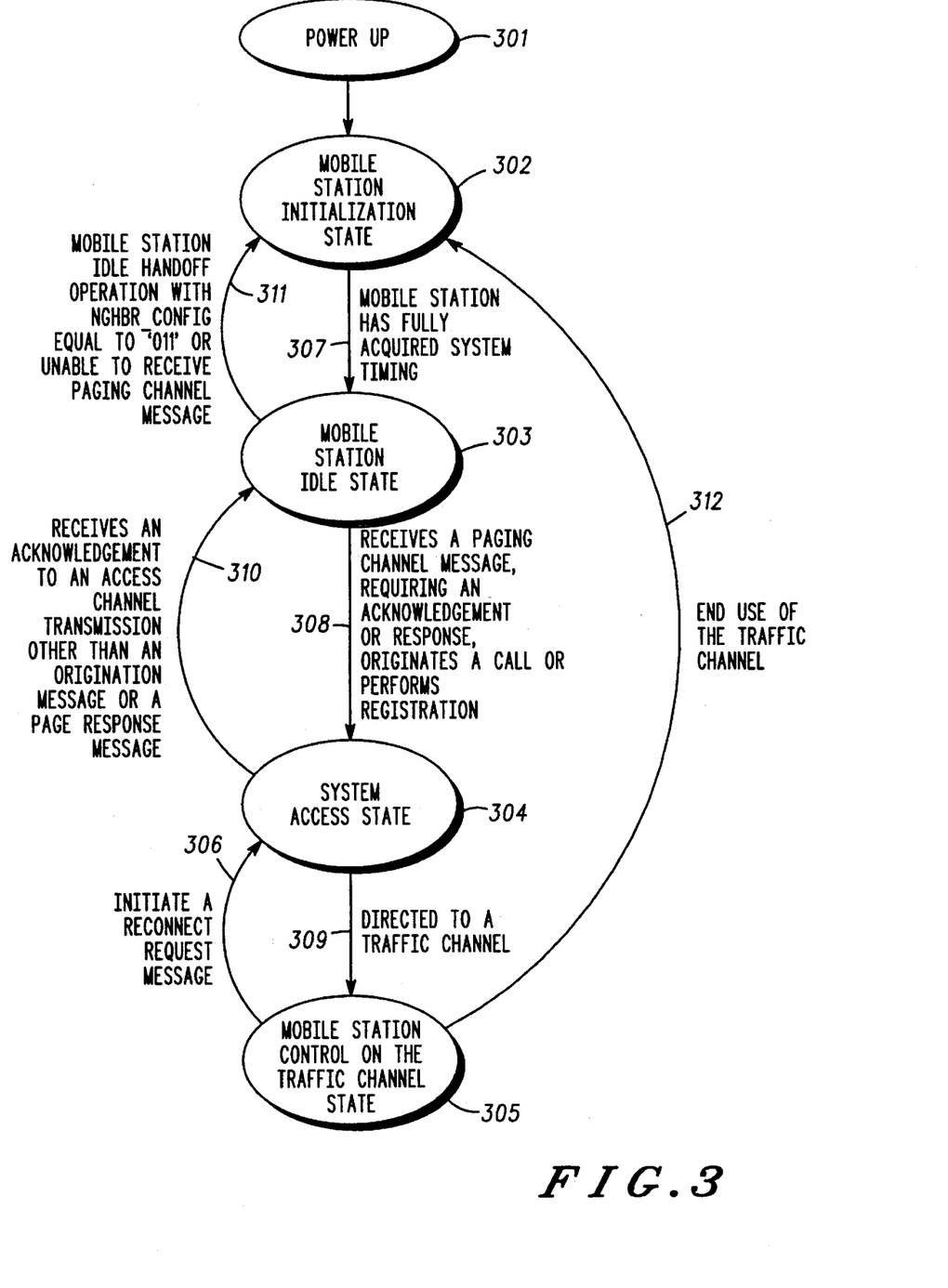
FIG. 3 illustrates call processing states for the mobile station of FIG. 2 in accordance with the present invention.

FIG. 3 illustrates call processing states 300 for the mobile station of FIG. 2 in accordance with the present invention. FIG. 3 generally illustrates a power-up state 301, a mobile station initialization state 302, a mobile station idle state 303, a system access state 304 and a mobile station control on the traffic channel state 305. At transition 307 the mobile station 119 has fully acquired system timing. At transition 308 the mobile station 119 receives a paging channel message, requiring an acknowledgment or response, originates a call or performs registration. At transition 309 the mobile station 119 is directed to a traffic channel. At transition 312 the mobile station 119 ends use of the traffic channel. At transition 310 the mobile station 119 receives an acknowledgment to an Access Channel transmission other than an Origination Message or a Page Mode Response. At transition 311 the mobile station 119 performs an Idle Handoff Operation with NGHBR_CONFIG equal to '011' or is unable to receive Paging Channel message. The states 301 through 305 of FIG. 3 an the transitions therebetween are generally described in the aforementioned IS-95 Standard, section 6.6, with the exception of a transition 306 from the mobile station control on the traffic channel state 305 to the system access state 304. At transition 306 the mobile station initiates a reconnect request message. The state transition 306 will be described in further detail with reference to FIGS. 4–9.

Figure 4:
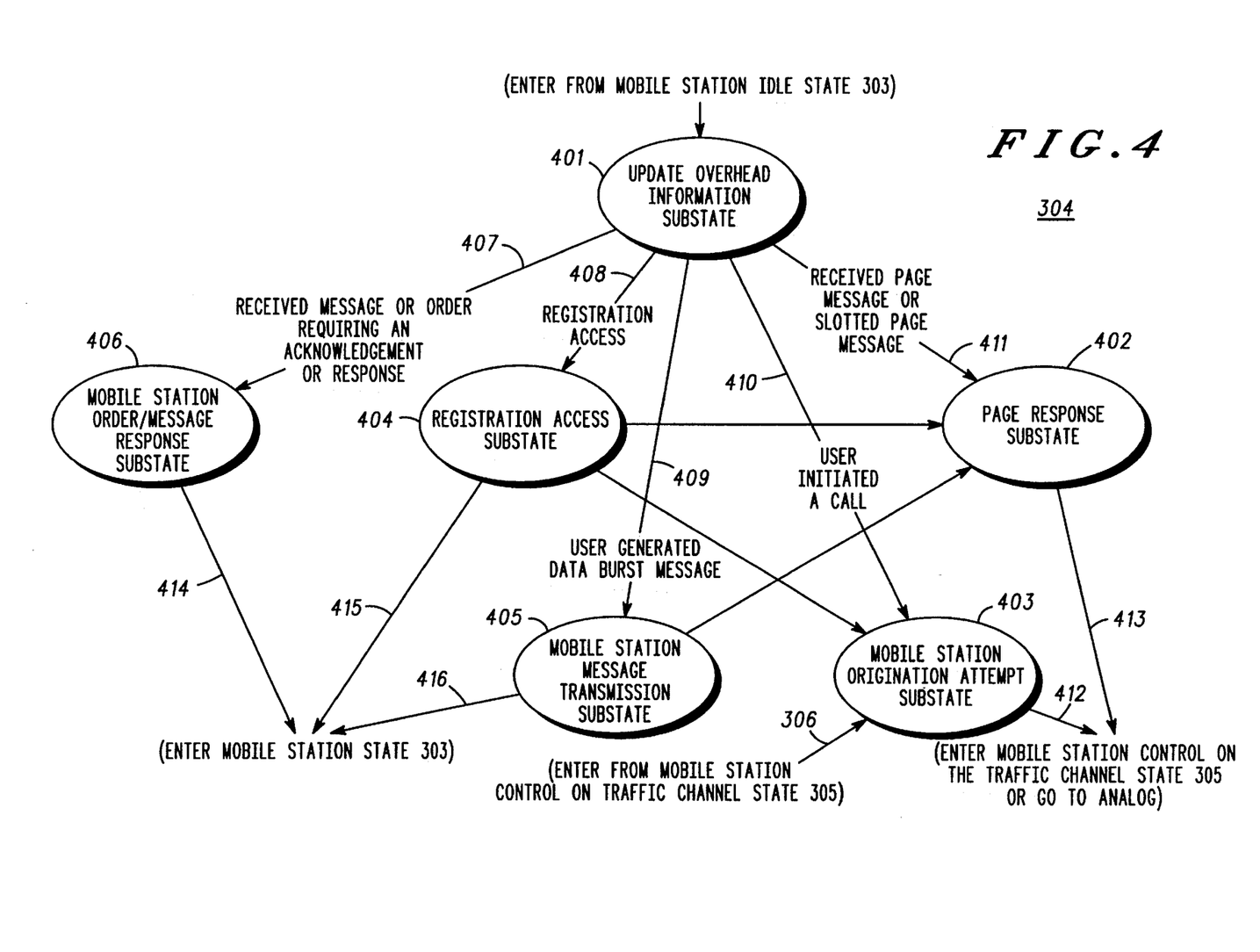
FIG. 4 illustrates details of a the system access state of the call processing states illustrated in FIG. 3 in accordance with the present invention.

FIG. 4 illustrates details of the system access state 304 of the call processing states illustrated in FIG. 3 in accordance with the present invention. In the system access state 304, the mobile station 119 sends messages to a base station on access channels and receives messages from the base station on paging channels. FIG. 4 generally includes an update overhead information substate 401, a page response substate 402, a mobile station origination attempt substate 403, a registration access substate 404, a mobile station message transmission substate 405 and a mobile station order/message response substate 406. At transition 407 the mobile station 119 received a message or order requiring an acknowledgment or response. At transition 408 the mobile station 119 attains registration access. At transition 409 the mobile station 119 receives a user generated data burst message. At transition 410 the mobile station 119 starts the process of a user initiated call. At transition 411 the mobile station 119 received a Page Message or Slotted Page Message. At transitions 412 and 413 the mobile station 119 enters the Mobile Station Control on the Traffic Channel State 305 of FIG. 3 or goes to analog mode. At transitions 414–416 the mobile station 119 enters the Mobile Station Idle state 303 of FIG. 3. States 401–406 and transitions 407–416 are generally described in the aforementioned IS-95 Standard, section 6.3 with the exception of the transition 306 into the mobile station origination attempt substate 403 wherein the mobile station initiates a reconnect request message. The transition 306 illustrates the destination of the transition 306 within the system access state 304 of FIG. 3. The state transition 306 will be described in further detail with reference to FIGS. 5–9.

Figure 5:
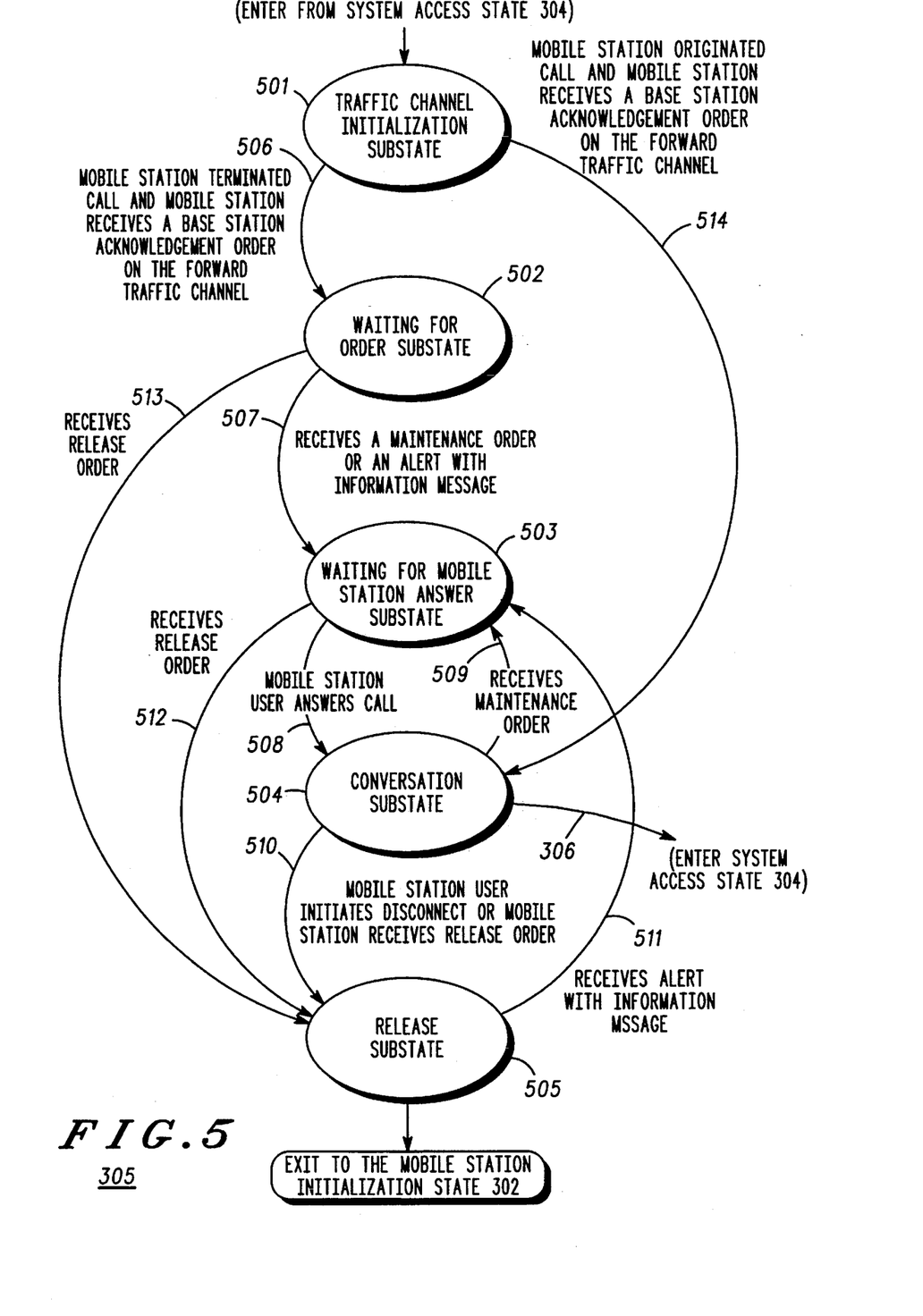
FIG. 5 illustrates details of a traffic channel state of the call processing states of FIG. 3 in accordance with the present invention.

FIG. 5 illustrates details of the traffic channel state 305 of the call processing states of FIG. 3 in accordance with the present invention. FIG. 5 generally includes a traffic channel initialization substate 501, a waiting for order substate 502, a waiting for mobile station answer substate 503, a conversation substate 504 and a release substate 505. At transition 506 the mobile station 119 terminates the active call and receives a Base Station Acknowledgment Order on the Forward Traffic Channel. At transition 507 the mobile station 119 receives a Maintenance Order or an Alert With Information Message. At transition 508 the mobile station 119 user answers the call. At transition 509 the mobile station 119 receives a Maintenance Order. At transition 510 the mobile station 119 user initiates disconnect or receives a Release Order. At transition 511 the mobile station 119 receives an Alert With Information Message. At transitions 512 and 513 the mobile station 119 receives a Release Order. At transition 514 the mobile station 119 originated a call and receives a Base Station Acknowledgment Order on the Forward Traffic Channel. The states 501–505 and transitions 506–514 are generally described in the aforementioned IS-95 Standard, section 6.6.4 with exception of state transition 306 wherein the mobile station initiates the reconnect request message. The transition 306 illustrates the origination of the transition 306 within the mobile station control on the traffic channel state 305 of FIG. 3. The state transition 306 will be described in further detail with reference to FIGS. 6–9.

Figure 6:
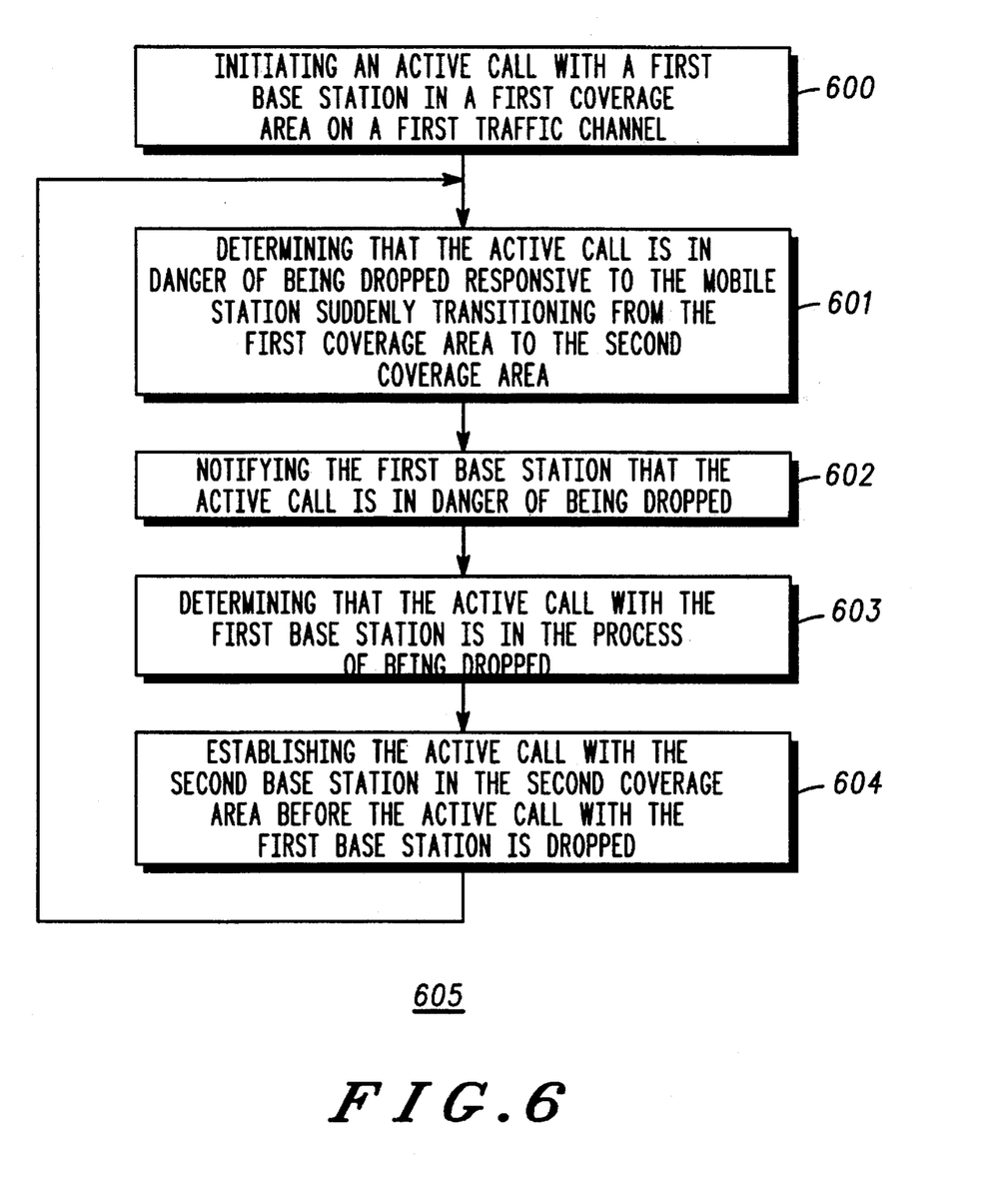
FIG. 6 illustrates a flow chart describing a method for preventing dropped calls in a radiotelephone system embodied within the conversation substate of FIG. 5 in accordance with the present invention.

FIG. 6 illustrates a flow chart describing a method 605 for preventing dropped calls in the radiotelephone system 100 embodied within the conversation substate 504 of FIG. 5 in accordance with the present invention. The method 605, performed by the mobile station 119, prevents the active call from being dropped when the mobile station 119 suddenly transitions from the first coverage area 121 to the second coverage area 122. At step 600, the method assumes that the mobile station 119 is initially in the active call with the first base station 115 in the first coverage area 121 on a first traffic channel. The method 605 of the present invention generally comprises four steps 601–604. Details of the four steps 601–604 will be described with reference to FIGS. 7-1 and 7-2. At step 601, the mobile station 119 determines that the active call is in danger of being dropped responsive to the mobile station 119 suddenly transitioning from the first coverage area 121 to the second coverage area 122. At step 602, the mobile station 119 notifies the first base station 115 that the active call is in danger of being dropped responsive to the step 601 of determining that the active call is in danger of being dropped. At step 603, the mobile station 119 determines that the active call with the first base station 115 is in the process of being dropped responsive to the step 602 of notifying the first base station 115 that the active call is in danger of being dropped. At step 604, the mobile station 119 establishes the active call with the second base station 116 in the second coverage area 122 before the active call with the first base station 115 is dropped responsive to the step 603 of determining that the active call with the first base station 115 is in the process of being dropped.

In contrast to the aforementioned prior art U.S. Pat. No. 4,811,380, the present invention advantageously improves the state of the art taught by the prior art by adding steps 601 and 602. As stated herein above, the mobile station of the prior art only takes action to recover a call after the absence of a signal transmission from the base station over a predetermined period of time. The prior art mobile station does not predict the changing RF conditions that are setting up a self-interference condition in the radiotelephone system that requires a hand-off. Steps 601 and 602 of the present invention, however, effectively give the mobile station 119 advance notice of a dropped call. The mobile station 119 can receive advanced notice while the mobile station is in an active call because the cellular radiotelephone system 100 is a digital system. The digital system permits the mobile station 119 to maintain the active call while anticipating the danger of the active call being dropped. Armed with this advanced notice, the mobile station 119 can take necessary steps in cooperation with the base stations to position itself in the radiotelephone system 100 before the process of dropping a call has begun. An advantage of the present invention is that the method of the present invention can be implemented by configuring the mobile station as described herein; no special changes are needed in the conventional method performed at the base stations 115, 116, 117 or switch controller 114. The mobile station 119 of the present invention, therefore, monitors the changing RF conditions thereby preventing either the active call from being dropped before the handoff messaging can be successfully completed or unacceptable time delay for the recovery of the dropped call.

FIGS. 7-1 and 7-2 illustrates details of the flow chart of FIG. 6 in accordance with the present invention. The steps 601–604 of FIG. 6 are outlined for reference. Step 601 of FIG. 6 generally comprises four steps 701–704. At step 701, the mobile station 119 monitors a total energy received by the mobile station 119. Referring briefly to FIG. 2, the total energy is received by the controller at line 226. At step 702, the mobile station 119 measures a signal energy for the active call received by the mobile station. Referring briefly to FIG. 2, the signal energy for the active call is received by the controller at line 228. At step 703, the mobile station 119 calculates a ratio of the signal energy to the total energy. At step 704, the mobile station 119 determines if the ratio is unfavorable. If, at step 704, the mobile station 119 determines that the ratio is unfavorable, indicating that active call is in danger of being dropped, the flow continues to step 602. If, at step 704, the mobile station 119 determines that the ratio is favorable, indicating that active call is in not danger of being dropped, the flow returns to step 705.

Figure 71:
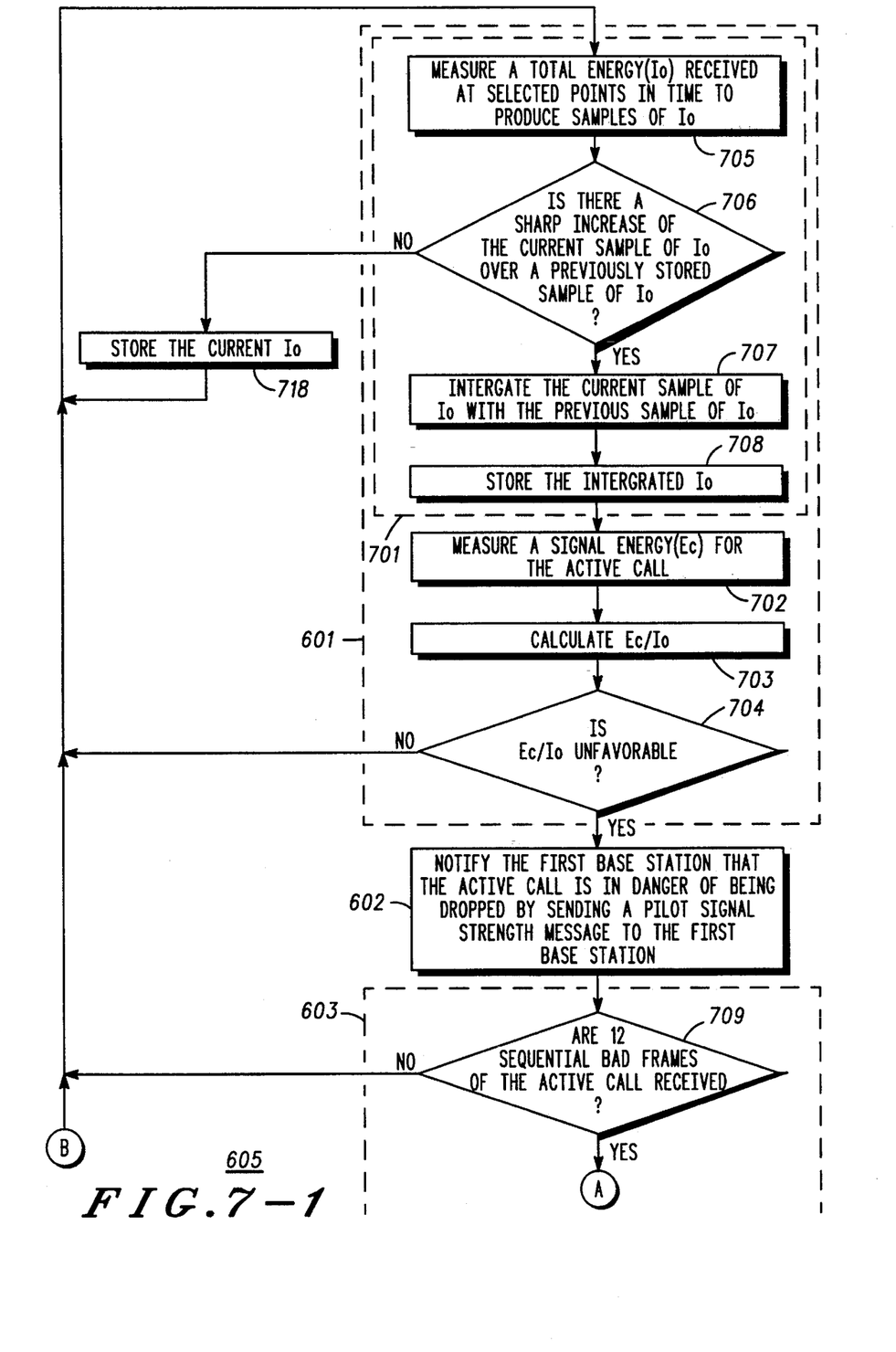

Step 701 generally comprises four steps 705–708. At step 705, the mobile station 119 measures the total energy received by the mobile station 119 at selected points in time to produce samples of the total energy including at least one previous sample and a current sample of the total energy. At step 706, the mobile station 119 determines that the current sample of the total energy is greater than the at least one previous sample of the total energy by a predetermined amount. At step 706, the mobile station 119 stores the current sample of the total energy at step 718 and returns to step 705, if the mobile station 119 determines that the current sample of the total energy is less than the at least one previous sample of the total energy by a predetermined amount. At step 707, the mobile station 119 integrates the current sample of total energy with the at least one previous sample of the total energy to produce an integrated total energy. At step 708, the mobile station 119 stores the integrated total energy to produce a stored total energy. Referring briefly to FIG. 2, the integrated total energy is stored in memory resident in the controller 203.

The step 602 of FIG. 6 of notifying the first base station that the active call is in danger of being dropped is generally performed by the mobile station 119 sending a pilot signal strength message to the first base station 115 indicative of signal strengths of a plurality of pilot signals 127, 126, 128 transmitted by the plurality of base stations 115, 116, 117, respectively. Referring briefly to FIG. 2, the mobile station 119 sends a pilot signal strength message from the controller 203 to the digital CDMA transmitter 218 via line 230.

According to the preferred embodiment of the present invention, the active call includes a plurality of sequential frames. The step 603 of FIG. 6 of determining that the active call with the first base station is in the process of being dropped generally comprises two steps 709 and 710. At step 709, the mobile station 119 determines if a predetermined number of sequential frames of the active call are unacceptable. If, at step 709, the mobile station 119 determines that a predetermined number of unacceptable sequential frames are received before receiving an acceptable frame, the flow continues to step 711, otherwise, the flow returns to step 705. At step 711 the mobile station 119 disables the digital CDMA transmitter 218 via line 230 in FIG. 2 and then continues to step 710. At step 710, the mobile station 119 determines if, within a predetermined amount of time, that no two sequential frames of the plurality of sequential frames are acceptable. If, at step 710, the mobile station 119 determines, within a predetermined amount of time, that two sequential frames of the plurality of sequential frames are acceptable, the flow returns to step 705. If, at step 710, the mobile station 119 determines, within a predetermined amount of time, that no two sequential frames of the plurality of sequential frames are acceptable, the flow continues to step 716.

The step 604 of establishing the active call with the second base station 116 in the second coverage area 122 generally comprises four steps 712–715. At step 712, the mobile station 119 identifies the second base station 116. At step 713, the mobile station 119 sends a reconnect request message to the second base station 116 responsive to the step 712 of identifying the second base station 116. Referring briefly to FIG. 2, the mobile station 119 sends the reconnect request message to the second base station 116 via the digital CDMA transmitter via line 230. Referring briefly to FIGS. 3, 4 and 5, the mobile station 119 sends the reconnect request message to the second base 116 as indicated by transition 306. The format of the reconnect request message will be described in more detail with reference to FIG. 8. At step 714, the mobile station 119 determines if a reconnect grant message was received from the second base station 116 within a predetermined amount of time responsive to the step 713 of sending a reconnect request message to the second base station. If, at step 714, the mobile station 119 determines that a reconnect grant message was received from the second base station 116 within a predetermined amount of time, the flow continues to step 715, otherwise, the flow returns to the Mobile Station Initialization State 302. Referring briefly to FIG. 2, the mobile station 119 receives the reconnect grant message from the second base station 116 via the Viterbi decoder 211 at line 229. The format of the reconnect grant message will be described in more detail with reference to FIG. 9. According the preferred embodiment, the step 714 of receiving a reconnect request message is accomplished by the mobile station 119 receiving the reconnect request message on a paging code channel. At step 715, the mobile station 119 resumes the active call in the second coverage area 122 with the second base station 116 on a second traffic channel responsive to the step 714 of receiving a reconnect grant message from the second base station 116.

Figure 72:
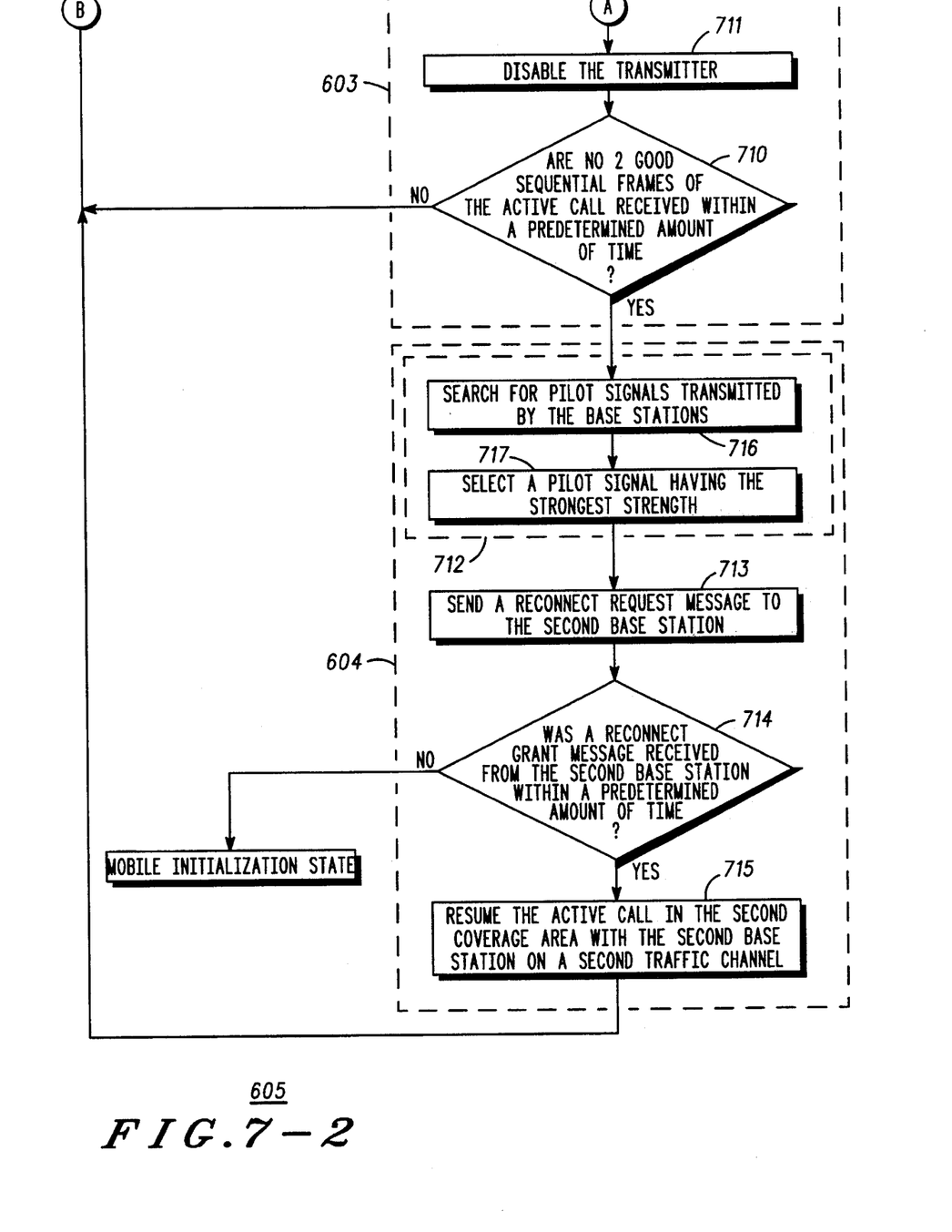

The step 712 of identifying the second base station 116 generally comprises two steps 716 and 717. At step 716, the mobile station 119 searches for a plurality of pilot signals 127, 126, 128 transmitted by the plurality of base stations 115, 116, 117, respectively. Referring briefly to FIG. 2, the mobile station 119 searches for a plurality of pilot signals received by the pilot scanner 210 and sent to the controller 203 at line 227. At step 717, the mobile station 119 selects a pilot signal 126 having the strongest signal strength from among the plurality of pilot signals, wherein the pilot signal 126 having the strongest signal strength corresponds to the pilot signal transmitted by the second base station 116.

Figure 8:
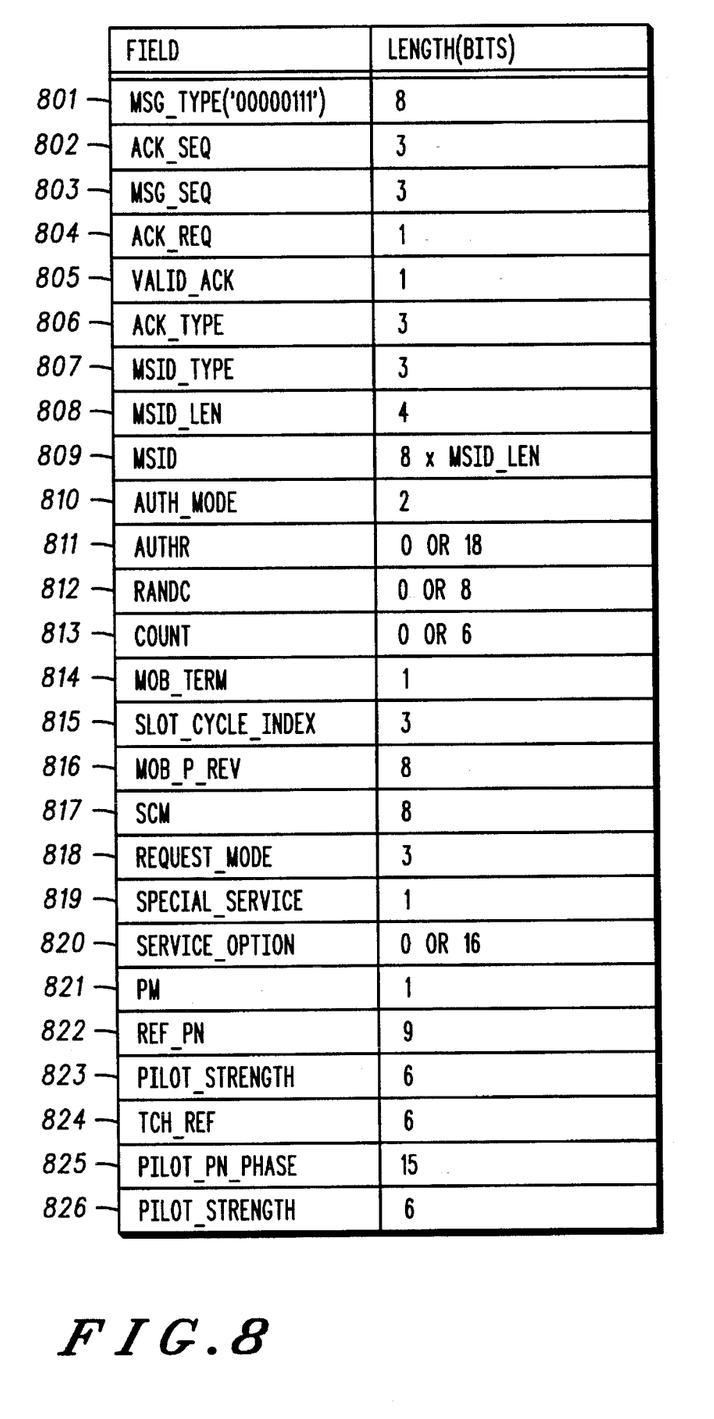
FIG. 8 illustrates a reconnect request message format used in FIGS. 3, 4, 5 and 7-2 in accordance with the present invention.

FIG. 8 illustrates the reconnect request message format used in FIGS. 3, 4, 5 and 7-2 in accordance with the present invention. Mobile station message formats are generally described in the aforementioned IS-95 Standard, section 6.7. The reconnect request message is similar to the Origination Message as described in the aforementioned IS-95 Standard. The message type field 801 (MSG_TYPE) has 8 bits and has a binary value of '00000111'. Fields 802 through 821 are exactly the same as an Origination Message as described in the aforementioned IS-95 Standard. The time reference PN sequence offset field 822 (REF_PN) is 9 bits long and designates the pilot phase that the mobile station 119 is currently using for its time reference. The pilot strength field 823 (PILOT_STRENGTH) is 6 bits long and gives the pilot strength of the pilot that the mobile station is currently using for its time reference. The traffic channel reference field 824 (TCH_REF) is 6 bits long and designates the traffic channel that is in use for communications with the first base station 115. The pilot measured phase field 825 (PILOT_PN_PHASE) is 15 bits long and reports the phase of a detected pilot referred to the zero offset PN pilot. The pilot strength field 826 (PILOT_STRENGTH) is 6 bits long and gives the pilot strength of the pilot referenced in field 825. Fields 825 and 826 are repeated until all the detected pilots have been reported.

Figure 9:
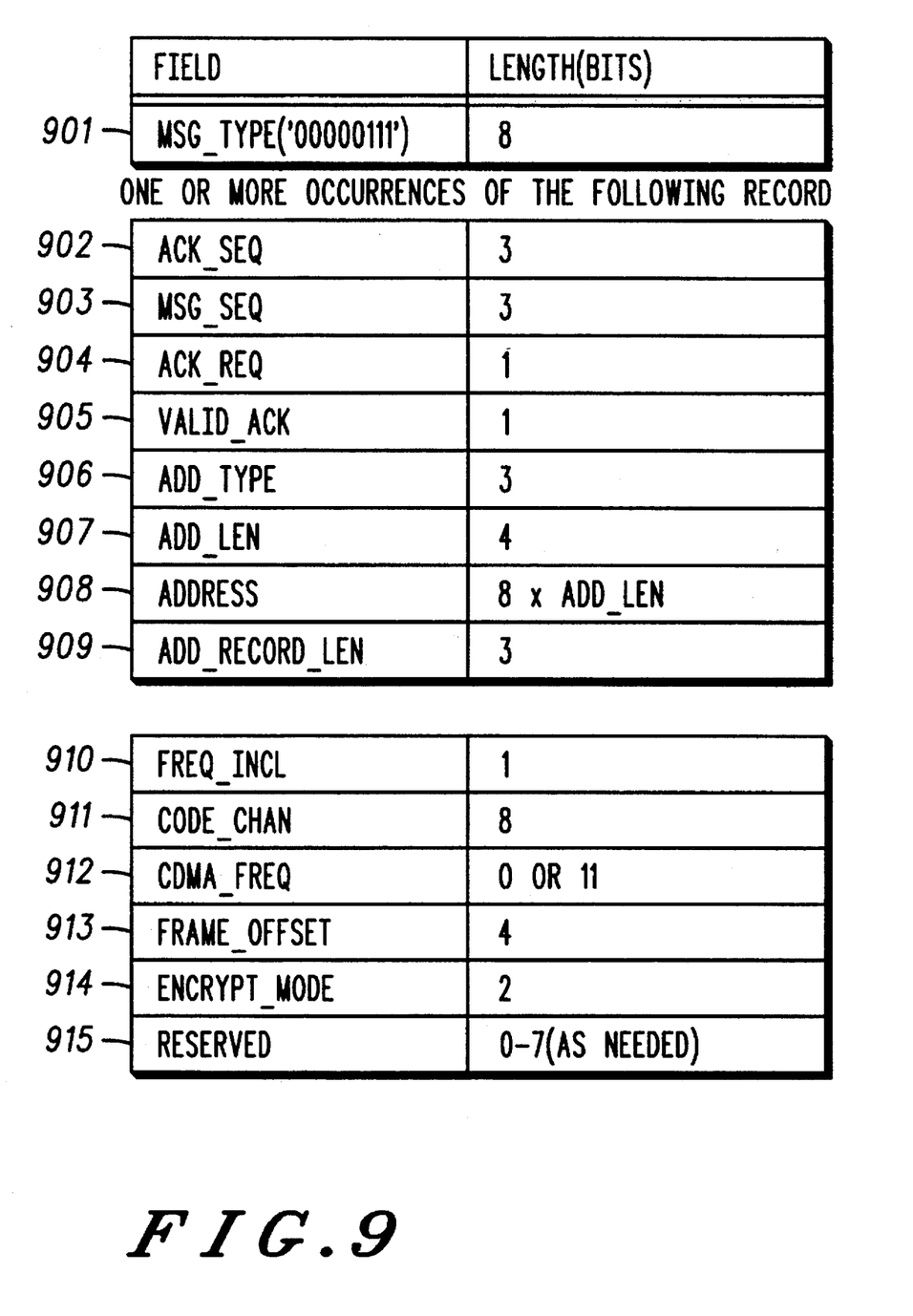
FIG. 9 illustrates a reconnect grant message format used in FIG. 7-2 in accordance with the present invention.

FIG. 9 illustrates the reconnect grant message format used in FIG. 7-2 in accordance with the present invention. Base station message formats are generally described in the aforementioned aforementioned IS-95 Standard, section 7.7. The reconnect grant message is similar to the Channel Assignment Message as described in the aforementioned IS-95 Standard, but is simplified by the removal of some fields since the "ASSIGN_MODE" is known. The message type field 901 is 8 bits long and has a binary value of '00001111'. The remainder of the message fields 902 through 915 that are used in the reconnect grant message are fully described in the Channel Assignment Message of the aforementioned IS95 Standard. These fields provide the mobile station 119 with all the information that it needs to acquire a new traffic channel with the second base station 116.

Thus, the present invention provides a method, performed by the mobile station, for preventing the active call from being dropped when the mobile station suddenly transitions from the first coverage area to the second coverage area. The present invention advantageously provides the mobile station 119 with advanced notice of the changing RF conditions before the call starts the process of being dropped. This advantage generally is provided by the mobile station performing the steps of determining 601 that the active call is in danger of being dropped responsive to the mobile station 119 suddenly transitioning from the first coverage area 121 to the second coverage area 122, and notifying 602 the first base station 115 that the active call is in danger of being dropped responsive to the step of determining 601 that the active call is in danger of being dropped. With the present invention the problems of either dropped calls before the handoff messaging can be successfully completed or the unacceptable time delay for the recovery of a dropped call of the prior art are substantially resolved.

While the present invention has been described with reference to illustrative embodiments thereof, it is not intended that the invention be limited to these specific embodiments. Those skilled in the art will recognize that variations and modifications can be made without departing from the spirit and scope of the invention as set forth in the appended claims.

What is claimed is:

1. In a cellular radiotelephone communication system including at least one switch controller, a plurality of base stations including first and second base stations, and at least one mobile station, wherein a switch controller is coupled to the first and second base stations to provide radiotelephone communication throughout first and second coverage areas, respectively, wherein a mobile station is in an active call in the first coverage area with the first base station on a first traffic channel and substantially shadowed from transmissions from the second base station in the second coverage area, a method, performed by the mobile station, for preventing the active call from being dropped when the mobile station suddenly transitions from the first coverage area to the second coverage area, the method comprising the steps of:

determining that the active call is in danger of being dropped responsive to the mobile station suddenly transitioning from the first coverage area to the second coverage area;

notifying the first base station that the active call is in danger of being dropped responsive to the step of determining that the active call is in danger of being dropped;

determining that the active call with the first base station is in the process of being dropped responsive to the step of notifying the first base station that the active call is in danger of being dropped; and establishing the active call with the second base station in the second coverage area before the active call with the first base station is dropped responsive to the step of determining that the active call with the first base station is in the process of being dropped.

2. A method for preventing the active call from being dropped according to claim 1 wherein the step of determining the active call is in danger of being dropped further comprises the step of:

monitoring a total energy received by the mobile station;

measuring a signal energy for the active call received by the mobile station;

calculating a ratio of the signal energy to the total energy; and determining that the ratio is unfavorable to indicate that active call is in danger of being dropped.

3. A method for preventing the active call from being dropped according to claim 2 wherein the step of monitoring the total energy received by the mobile station further comprises the steps of:

measuring the total energy received by the mobile station at selected points in time to produce samples of the total energy including at least one previous sample and a current sample of the total energy;

determining that the current sample of the total energy is greater than the at least one previous sample of the total energy by a predetermined amount;

integrating the current sample of total energy with the at least one previous sample of the total energy to produce an integrated total energy; and storing the integrated total energy to produce a stored total energy.

4. A method for preventing the active call from being dropped according to claim 1 wherein the step of notifying the first base station that the active call is in danger of being dropped further comprises the step of:

sending a pilot signal strength message to the first base station indicative of signal strengths of a plurality of pilot signals transmitted by the plurality of base stations, respectively.

5. A method for preventing the active call from being dropped according to claim 1, wherein the active call includes a plurality of sequential frames, wherein the step of determining that the active call with the first base station is in the process of being dropped further comprises the step of:

determining that a predetermined number of the plurality of sequential frames are unacceptable; and determining, within a predetermined amount of time, that no two sequential frames of the plurality of sequential frames are acceptable.

6. A method for preventing the active call from being dropped according to claim 1 wherein the step of establishing the active call with the second base station in the second coverage area further comprises the steps of:

identifying the second base station;

sending a reconnect request message to the second base station responsive to the step of identifying the second base station;

receiving a reconnect grant message from the second base station within a predetermined amount of time responsive to the step of sending a reconnect request message to the second base station; and resuming the active call in the second coverage area with the second base station on a second traffic channel responsive to the step of receiving a reconnect grant message from the second base station.

7. A method for preventing the active call from being dropped according to claim 6 wherein the step of identifying the second base station further comprises the steps of:

searching for a plurality of pilot signals transmitted by the plurality of base stations, respectively; and selecting a pilot signal having the strongest signal strength from among the plurality of pilot signals, wherein the pilot signal having the strongest signal strength corresponds to the pilot signal transmitted by the second base station.

8. A method for preventing the active call from being dropped according to claim 6 wherein the step of receiving a reconnect request message further comprises the step of:

receiving the reconnect request message on a paging code channel.

9. In a code division multiple access (CDMA) cellular radiotelephone communication system including at least one switch controller, a plurality of base stations including first and second base stations, and at least one mobile station, wherein a switch controller is coupled to the first and second base stations to provide radiotelephone communication throughout first and second coverage areas, respectively, wherein a mobile station is in an active call in the first coverage area with the first base station on a first traffic channel and substantially shadowed from transmissions from the second base station in the second coverage area, a method, performed by the mobile station, for preventing the active call from being dropped when the mobile station suddenly transitions from the first coverage area to the second coverage area, the method comprising the steps of:

monitoring a total energy received by the mobile station;

measuring a signal energy for the active call received by the mobile station;

calculating a ratio of the signal energy to the total energy;

determining that the ratio is unfavorable to indicate that active call is in danger of being dropped;

sending a pilot signal strength message to the first base station indicative of signal strengths of a plurality of pilot signals transmitted by the plurality of base stations, respectively, responsive to the step of determining that the ratio is unfavorable;

determining that the active call with the first base station is in the process of being dropped responsive to the step of sending a pilot signal strength message to the first base station; and establishing the active call with the second base station in the second coverage area before the active call with the first base station is dropped responsive to the step of determining that the active call with the first base station is in the process of being dropped.

10. A method for preventing the active call from being dropped according to claim 9 wherein the step of monitoring the total energy received by the mobile station further comprises the steps of:

measuring the total energy received by the mobile station at selected points in time to produce samples of the total energy including at least one previous sample and a current sample of the total energy;

determining that the current sample of the total energy is greater than the at least one previous sample of the total energy by a predetermined amount;

integrating the current sample of total energy with the at least one previous sample of the total energy to produce an integrated total energy; and storing the integrated total energy to produce a stored total energy.

11. A method for preventing the active call from being dropped according to claim 9 wherein the active call includes a plurality of sequential frames, wherein the step of determining that the active call with the first base station is in the process of being dropped further comprises the step of:

determining that a predetermined number of the plurality of sequential frames are unacceptable; and determining, within a predetermined amount of time, that no two sequential frames of the plurality of sequential frames are acceptable.

12. A method for preventing the active call from being dropped according to claim 9 wherein the step of establishing the active call with the second base station in the second coverage area further comprises the steps of:

identifying the second base station;

sending a reconnect request message to the second base station responsive to the step of identifying the second base station;

receiving a reconnect grant message from the second base station within a predetermined amount of time responsive to the step of sending a reconnect request message to the second base station; and resuming the active call in the second coverage area with the second base station on a second traffic channel responsive to the step of receiving a reconnect grant message from the second base station.

13. A method for preventing the active call from being dropped according to claim 12 wherein the step of identifying the second base station further comprises the steps of:

searching for a plurality of pilot signals transmitted by the plurality of base stations, respectively; and selecting a pilot signal having the strongest signal strength from among the plurality of pilot signals, wherein the pilot signal having the strongest signal strength corresponds to the pilot signal transmitted by the second base station.

14. A method for preventing the active call from being dropped according to claim 12 wherein the step of receiving a reconnect request message further comprises the step of:

receiving the reconnect request message on a paging code channel.

15. In a code division multiple access (CDMA) cellular radiotelephone communication system including at least one switch controller, a plurality of base stations including first and second base stations, and at least one mobile station, wherein a switch controller is coupled to the first and second base stations to provide radiotelephone communication throughout first and second coverage areas, respectively, wherein a mobile station is in an active call in the first coverage area with the first base station on a first traffic channel and substantially shadowed from transmissions from the second base station in the second coverage area, a method, performed by the mobile station, for preventing the active call from being dropped when the mobile station suddenly transitions from the first coverage area to the second coverage area, the method comprising the steps of:

determining that the active call is in danger of being dropped responsive to the mobile station suddenly transitioning from the first coverage area to the second coverage area;

notifying the first base station that the active call is in danger of being dropped responsive to the step of determining that the active call is in danger of being dropped;

determining that the active call with the first base station is in the process of being dropped responsive to the step of notifying the first base station that the active call is in danger of being dropped;

searching for a plurality of pilot signals transmitted by the plurality of base stations, respectively, responsive to the step of determining that the active call with the first base station is in the process of being dropped;

selecting a pilot signal having the strongest signal strength from among the plurality of pilot signals, wherein the pilot signal having the strongest signal strength corresponds to the pilot signal transmitted by the second base station;

sending a reconnect request message to the second base station responsive to the step of identifying the second base station responsive to the step of determining the pilot signal having the strongest signal strength from among the plurality of pilot signals;

receiving a reconnect grant message from the second base station within a predetermined amount of time responsive to the step of sending a reconnect request message to the second base station; and resuming the active call in the second coverage area with the second base station on a second traffic channel responsive to the step of receiving a reconnect grant message from the second base station.

16. A method for preventing the active call from being dropped according to claim 15 wherein the step of determining the active call is in danger of being dropped further comprises the step of:

monitoring a total energy received by the mobile station;

measuring a signal energy for the active call received by the mobile station;

calculating a ratio of the signal energy to the total energy; and determining that the ratio is unfavorable to indicate that active call is in danger of being dropped.

17. A method for preventing the active call from being dropped according to claim 16 wherein the step of monitoring the total energy received by the mobile station further comprises the steps of:

measuring the total energy received by the mobile station at selected points in time to produce samples of the total energy including at least one previous sample and a current sample of the total energy;

determining that the current sample of the total energy is greater than the at least one previous sample of the total energy by a predetermined amount;

integrating the current sample of total energy with the at least one previous sample of the total energy to produce an integrated total energy; and storing the integrated total energy to produce a stored total energy.

18. A method for preventing the active call from being dropped according to claim 15 wherein the step of notifying the first base station that the active call is in danger of being dropped further comprises the step of:

sending a pilot signal strength message to the first base station indicative of signal strengths of a plurality of pilot signals transmitted by the plurality of base stations, respectively.

19. A method for preventing the active call from being dropped according to claim 15 wherein the active call includes a plurality of sequential frames, wherein the step of determining that the active call with the first base station is in the process of being dropped further comprises the step of:

determining that a predetermined number of the plurality of sequential frames are unacceptable; and determining, within a predetermined amount of time, that no two sequential frames of the plurality of sequential frames are acceptable.

20. In a code division multiple access (CDMA) cellular radiotelephone communication system including at least one switch controller, a plurality of base stations including first and second base stations, and at least one mobile station, wherein a switch controller is coupled to the first and second base stations to provide radiotelephone communication throughout first and second coverage areas, respectively, wherein a mobile station is in an active call in the first coverage area with the first base station on a first traffic channel and substantially shadowed from transmissions from the second base station in the second coverage area, a method, performed by the mobile station, for preventing the active call from being dropped when the mobile station suddenly transitions from the first coverage area to the second coverage area, the method comprising the steps of:

monitoring a total energy received by the mobile station;

measuring a signal energy for the active call received by the mobile station;

calculating a ratio of the signal energy to the total energy;

determining that the ratio is unfavorable to indicate that active call is in danger of being dropped;

sending a pilot signal strength message to the first base station indicative of signal strengths of a plurality of pilot signals transmitted by the plurality of base stations, respectively, responsive to the step of determining that the ratio is unfavorable;

determining that the active call with the first base station is in the process of being dropped responsive to the step of sending a pilot signal strength message to the first base station;

searching for a plurality of pilot signals transmitted by the plurality of base stations, respectively, responsive to the step of determining that the active call with the first base station is in the process of being dropped;

selecting a pilot signal having the strongest signal strength from among the plurality of pilot signals, wherein the pilot signal having the strongest signal strength corresponds to the pilot signal transmitted by the second base station;

sending a reconnect request message to the second base station responsive to the step of identifying the second base station responsive to the step of selecting the pilot signal having the strongest signal strength from among the plurality of pilot signals;

receiving a reconnect grant message from the second base station within a predetermined amount of time responsive to the step of sending a reconnect request message to the second base station; and resuming the active call in the second coverage area with the second base station on a second traffic channel responsive to the step of receiving a reconnect grant message from the second base station.

21. A method for preventing the active call from being dropped according to claim 20 wherein the step of monitoring the total energy received by the mobile station further comprises the steps of:

measuring the total energy received by the mobile station at selected points in time to produce samples of total energy including at least one previous sample and a current sample of the total energy;

determining that the current sample of the total energy is greater than the at least one previous sample of the total energy by a predetermined amount;

integrating the current sample of total energy with the at least one previous sample of the total energy to produce an integrated total energy; and storing the integrated total energy to produce a stored total energy.

22. A method for preventing the active call from being dropped according to claim 20 wherein the active call includes a plurality of sequential frames, wherein the step of determining that the active call with the first base station is in the process of being dropped further comprises the step of:

determining that a predetermined number of the plurality of sequential frames are unacceptable; and determining, within a predetermined amount of time, that no two sequential frames of the plurality of sequential frames are acceptable.

\* \* \* \* \*